United States Patent [19]

Chen

[11] Patent Number: 5,471,530
[45] Date of Patent: Nov. 28, 1995

[54] RETAINING RACK FOR A CELLULAR PHONE PERMITTING HANDFREE USE OF PHONE IN DRIVING

[75] Inventor: Stephen Chen, Changhua, Taiwan

[73] Assignee: E Lead Electronic Co., Ltd., Changhua, Taiwan

[21] Appl. No.: 326,241

[22] Filed: Oct. 20, 1994

[51] Int. Cl.$^6$ ...................................................... H04M 1/00
[52] U.S. Cl. .......................... 379/446; 379/426; 379/454; 379/455
[58] Field of Search ...................................... 379/446, 426, 379/454, 455, 449, 447

[56] References Cited

U.S. PATENT DOCUMENTS

| | | | |
|---|---|---|---|
| 949,814 | 2/1910 | Zinsmayer | 379/454 |
| 2,712,039 | 6/1955 | Holmes | 379/454 |
| 5,282,246 | 1/1994 | Yang | 379/454 |
| 5,396,556 | 3/1995 | Chen | 379/455 |

*Primary Examiner*—Jeffery A. Hofsass
*Assistant Examiner*—Jack Chiang
*Attorney, Agent, or Firm*—Browdy and Neimark

[57] ABSTRACT

A cellular phone retaining rack permits a driver of a vehicle to operate a cellular phone in a handfree manner. A mounting base is inserted into a fissure between a door and the glass thereof and a clamping board is adjustably secured to the mounting base. A hollow pivot arm having a spring housed therein is pivotally engaged with the mounting base. To each end of the spring is fixed a detent member. A securing piece is fixed to one side or the bottom of a phone retaining seat and one end of the securing piece is pivotally engaged with one end of the pivot arm. A ratchet gear is disposed at one end of the securing piece which can be in locking engaged with one detent member of the pivot arm so as to lock the retaining seat in place after each adjustment. The detent member at the other end of the pivot arm is engaged with an oblique lug having a recess at one end extended from the mounting base so as to retain the pivot arm in place after each pivot adjustment thereof. A voice pick-up is brought to abut against the receiver of a cellular phone and a speaker electrically connected to the voice pick-up is mounted to the clamping board so that the cellular phone can be easily moved to the mouth of a driver by adjusting the pivot arm and the phone retaining seat.

5 Claims, 7 Drawing Sheets

RETAINING RACK FOR A CELLULAR PHONE PERMITTING HANDFREE USE OF PHONE IN DRIVING

BACKGROUND OF THE INVENTION

The present invention relates to a retaining rack for securing a cellular phone to a window of an automobile. The retaining rack has a mounting base having a vertical portion and a horizontal portion. The vertical portion is inserted into the fissure between the door and a glass of that door of a vehicle. A clamping board adjustably associated with the mounting base is engaged with a speaker and a battery box. A securing piece is removably fixed to a phone retaining seat having a voice pick-up. A pivot arm having one end pivotally engaged with an obliquely extended lug of the horizontal portion of the mounting base and the other end pivotally associated with one end of the securing piece. A cellular phone is held by a spring biased clamping member of the retaining seat with the voice pick-up which is electrically connected to the speaker in abutment against the receiver of the phone whereby the phone can be adjusted to fit to the mouth of a driver by pivotal actuation of the pivot arm and a retaining seat.

The pivot arm is hollow in structure with a spring received therein and a detent member is secured to each end thereof. A ratchet gear is disposed at one end of the securing piece so that the detent member can lock the retaining seat in place after each adjustment. The oblique lug is provided with a recess which can be in locking engagement with another detent member of the pivot arm.

Cellular phones have become indispensable communication tools for businessmen or people on constant move in or off office hours in modern big cities. Most of the communication activities take place when driving vehicles on road. It is very dangerous for a driver to make a phone call with one hand holding a phone and steering wheel and the other doing the dialing on a phone. So, it is prohibited in many countries for a driver to make phone calls in driving.

There have been various types of phone racks available in the market, but they are not well designed to facilitate a driver to operate a phone without holding the phone when dialing and talking on the phone.

In the U.S. Pat. Nos. 5,179,590 and 5,128,994, there are two prior arts disclosed. Those patents are mainly used to mount a cellular phone and are fixed mainly to a vehicle's front panel. A driver has to take a cellular phone off such prior art rack after dialing numbers and hold the phone with one hand during driving of a vehicle. Both of the prior arts are not user-friendly designs because drivers still have to keep one hand occupied with a cellular phone when making a call.

SUMMARY OF THE INVENTION

Therefore, the primary object of the present invention is to provide a phone retaining rack for a cellular phone which can be adjusted to fit to the mouth of a driver so as to permit handfree use of a phone in driving a vehicle.

DETAILED DESCRIPTION OF THE PREFERRED EMBODIMENTS

Figure 1:
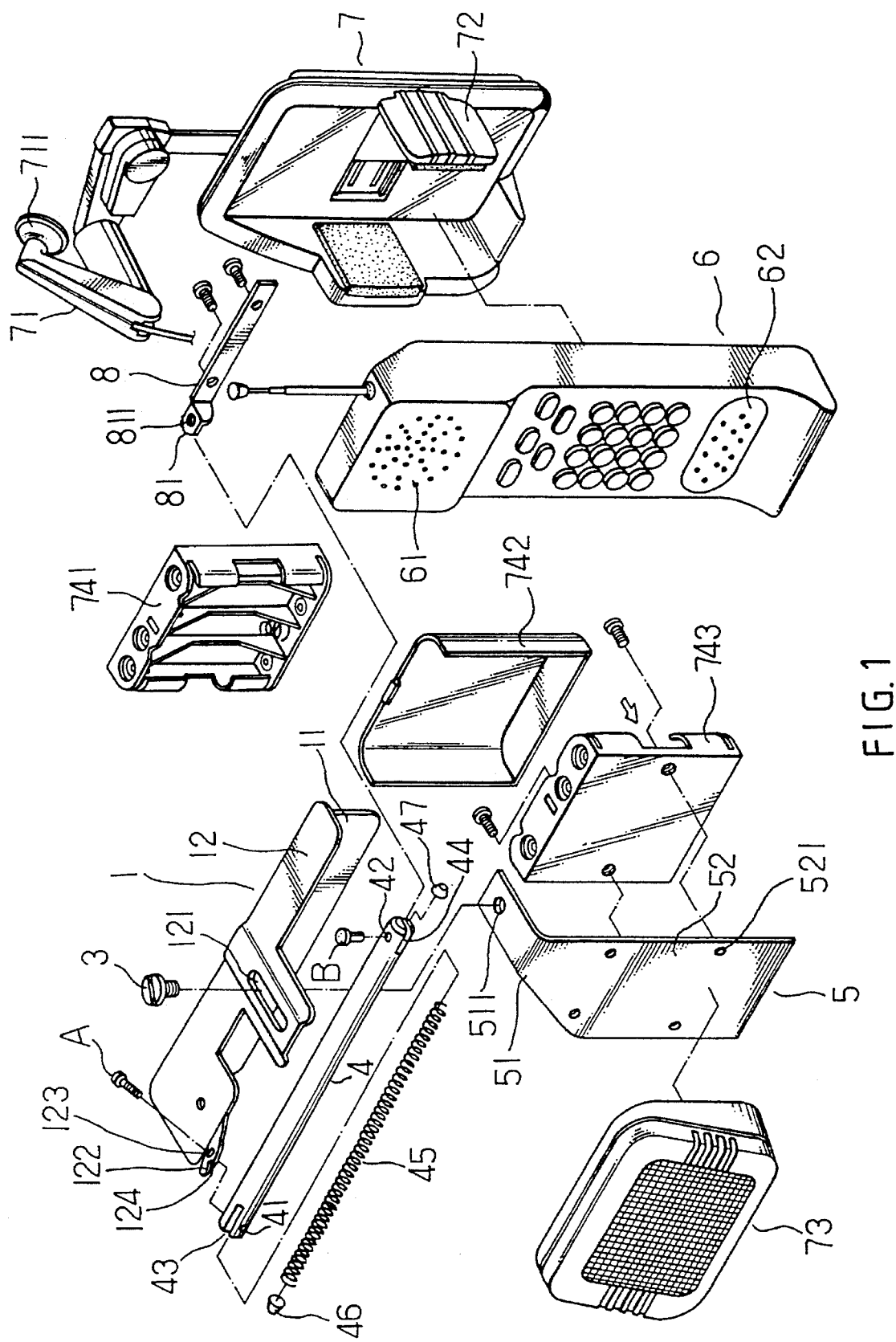
FIG. 1 is a perspective diagram showing the exploded components of the present invention.
Figure 2:
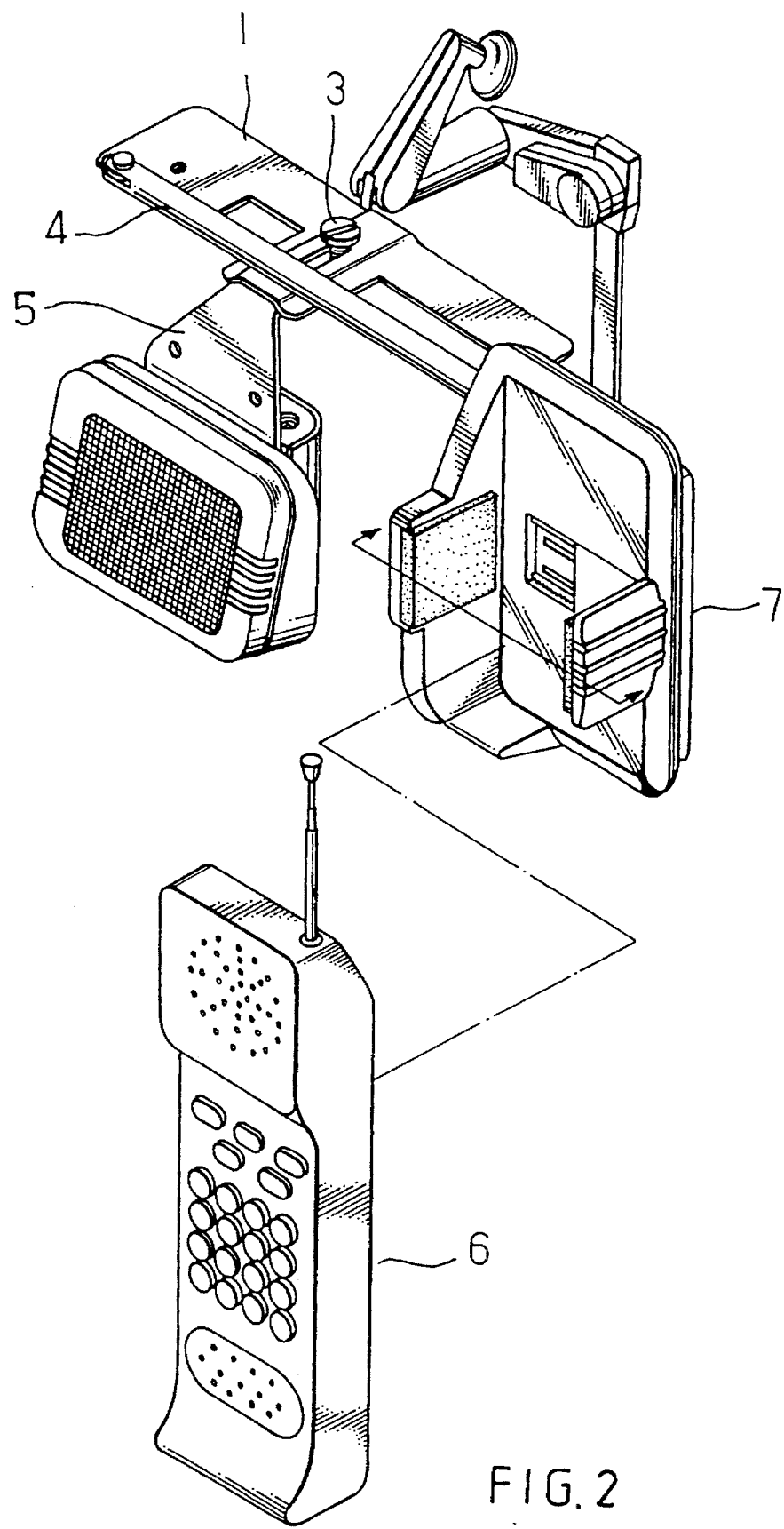
FIG. 2 is a perspective diagram showing the assembly thereof with a cellular phone dismounted therefrom.

Referring to FIGS. 1, 2, the present invention is comprised of a mounting base 1, a clamping board 5, a pivot arm 4, a phone retaining seat 7, a securing piece 8, a fixing bolt 3 and screws 31, 32.

The mounting base 1 is made up of a vertical portion 11 and a horizontal portion 12 at the center of which is disposed a laterally extended slot 121. An obliquely extended lug 122 on the tip of which is defined an open-ended recess 124 is disposed at one end of the horizontal portion 12. Near the base of the lug 122 is disposed a hole 123 for passage of a screw 31 which pivotally secure the pivot arm 4 in place.

The clamping board 5 approximately has an inverted L shape and on the horizontal plane thereof is disposed a screw hole 511 with which the fixing bolt 3 is tightly engaged. On the vertical plane of the clamping board 5 are disposed a number of holes 521 so as to permit a battery box 74 having an upper case 741, a lower case 743 and an external shield 742 as well as a speaker 73 to be fastened to each side of the vertical plane of the clamping board 5.

The fixing bolt 3 leading through the extended slot 121 of the horizontal portion 12 of the mounting base 1 is engaged with the screw hole 511 of the clamping board 5, permitting the clamping board 5 to be adjustably moved.

The pivot arm 4 is a hollow rod having a spring 45 housed therein with detent members 46, 47 secured at the respective ends thereof. The respective end of the pivot arm 4 has a slot cut 43 or 44 and a through hole 41, or 42 is disposed orthogonally with respect to the slot cut 43, and 44 respectively.

The phone retaining seat 7 permitting a cellular phone 6 to be mounted thereto is connected to a securing piece 8 at one side or bottom thereof. A voice pick-up 711 fixed to the top end of a pick-up arm 71 is adjusted to abut against the receiver 61 of a cellular phone 6. A spring biased clamping member 72 can clamp the cellular phone 6 in place.

At one end of the securing piece 8 is disposed a ratchet gear 81 which has a shaft hole 811 at the center thereof. As previously mentioned, the securing piece 8 is fixed to one side or the bottom of the phone retaining seat 7.

Figure 4:
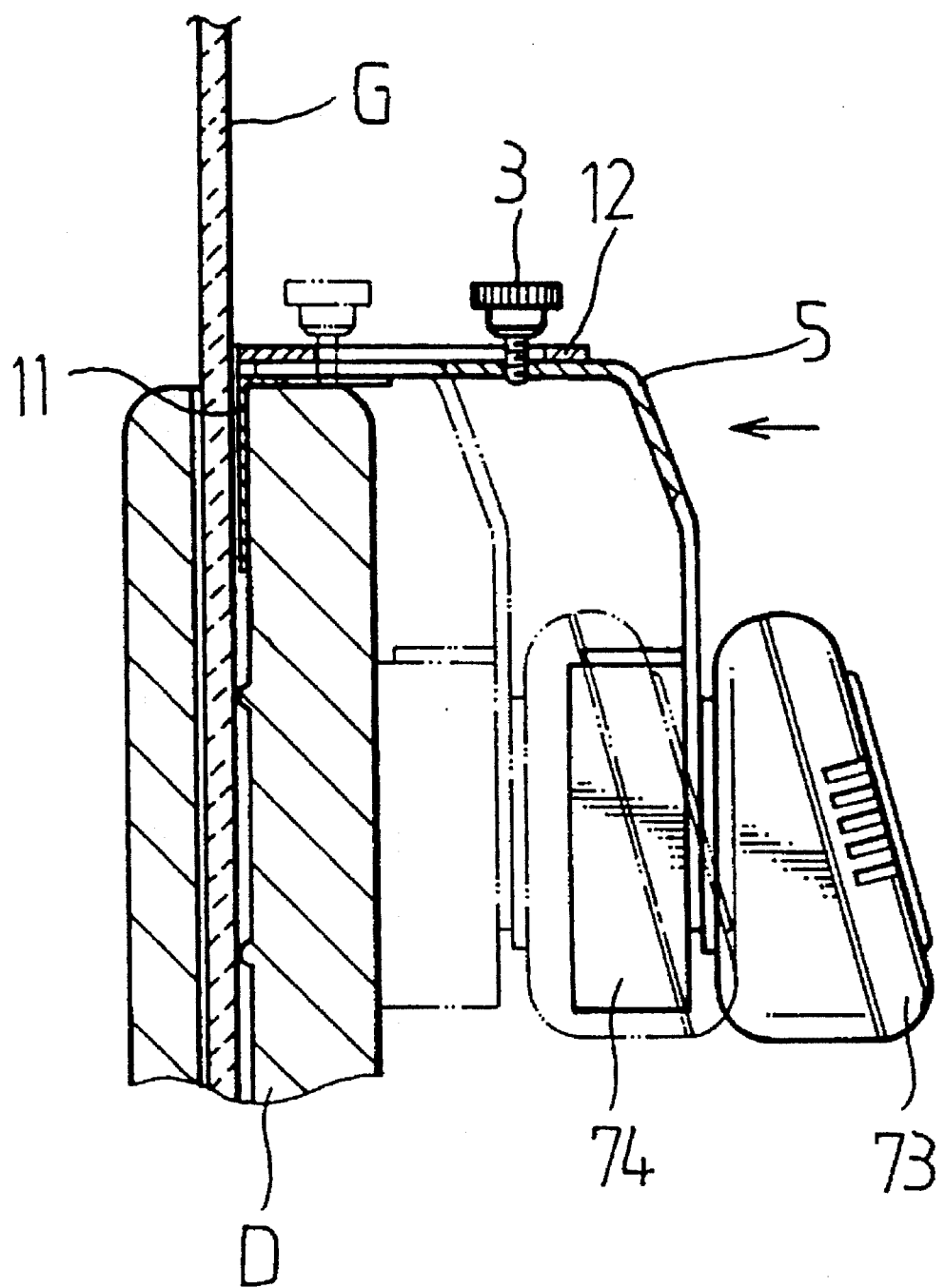
FIG. 4 is a diagram showing the clamping board being adjusted to locate outwardly.

Referring to FIG. 4, as the present invention is to be secured to a door D of an automobile, the vertical portion 11 of the mounting base 1 is first inserted into the fissure between the door D and a glass G. Since the vertical portion 11 is designed to be very thin so that the fixing of the mounting base 1 will not hinder the up and down operation of the glass G. Then, the clamping board 5 is pushed against the wall of the door D, and the fixing bolt 3 is tightened up against the through hole 511 of the clamping board 5 so as to permit the whole structure to be engaged with the door D of an automobile. In reverse, to disengage the structure of the present invention from the door D, one only has to get the bolt 3 loosened and pull the clamping board 5 outwardly, the whole structure of the present invention can be dismounted from the fissure of the door D.

Figure 3:
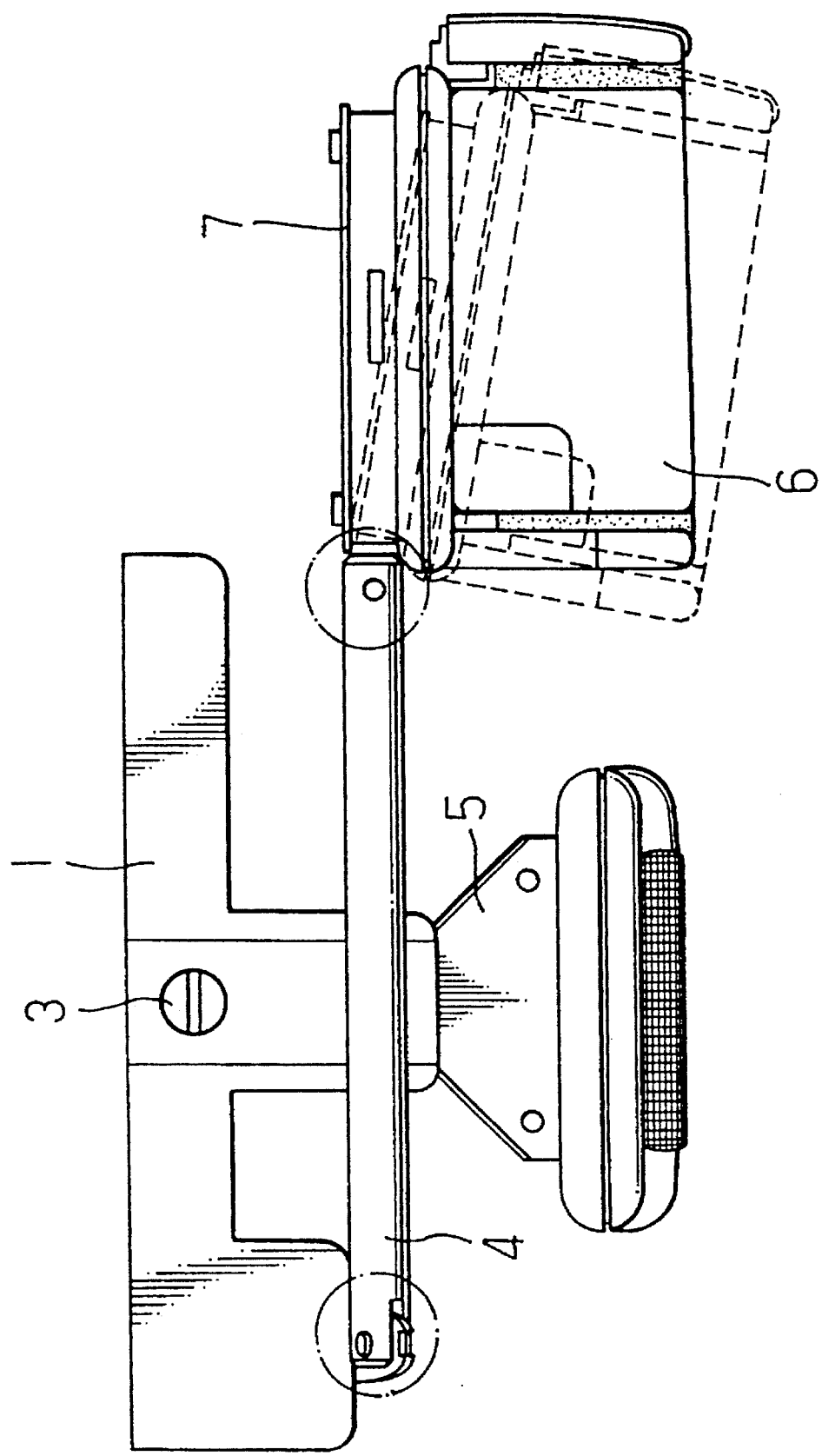
FIG. 3 is a plane view showing the pivotal operation of the phone retaining seat.
Figure 3A:
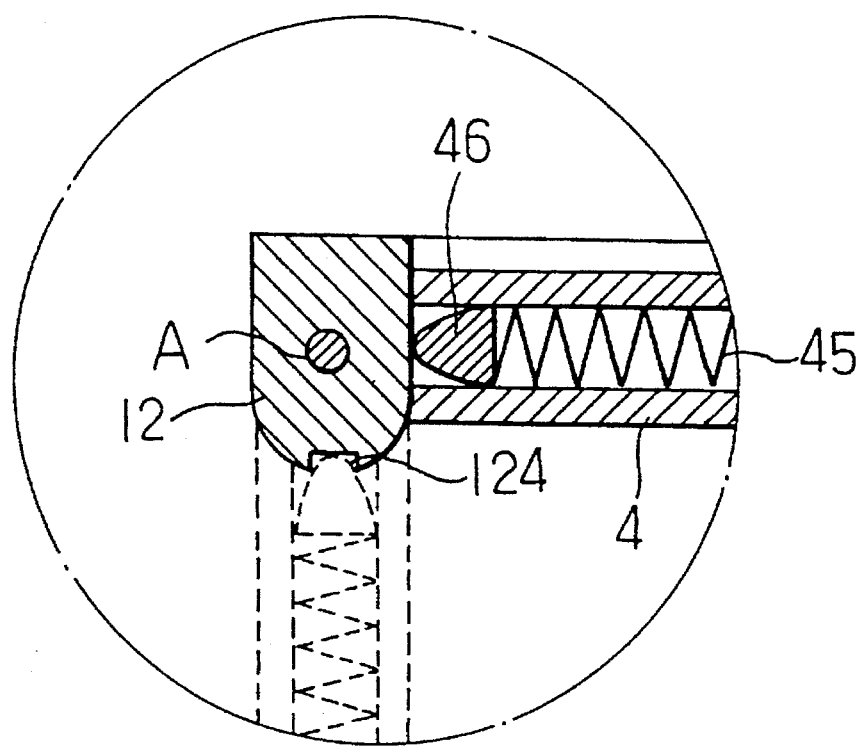
FIG. 3A is an enlarged diagram showing the engagement of the detent member with a retaining recess of an oblique extended lug of the mounting base.
Figure 3B:
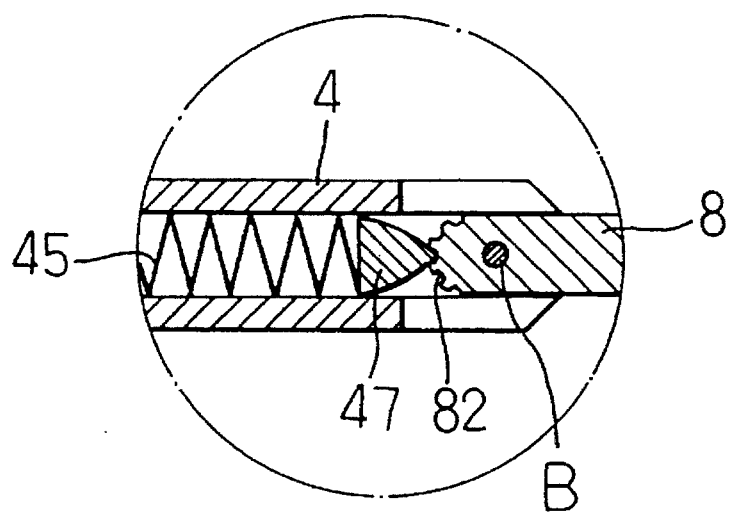
FIG. 3B is a diagram showing another detent member in engagement with a ratchet gear of a pivot arm.

Referring further to FIG. 3B, the securing piece 8 is not only fixed to the phone retaining seat 7, the ratchet gear 81 is disposed inside the slot cut 44 of the pivot arm 4 and is fixed in place to one end of the arm 4 by a bolt 32 led through the through hole 42 and the central shaft hole 811 of the ratchet gear 81. In such a manner, the phone retaining seat 7 can be pivotally secured to the pivot arm 4. The detent member 47 outwardly urged by the spring 45 is in retaining engagement with one gear of the ratchet gear 81 automatically after each pivot adjustment of the location of the phone retaining seat 7, preventing the phone retaining seat 7 from swinging back and forth in practical use.

As shown in FIG. 3, when a driver intends to make a phone call, the phone retaining seat 7 can be pivoted to make the dial buttons face the driver, facilitating the dialing operation thereof. Thus, a driver does not have to hold a cellular phone by one hand which holds the steering wheel at the same time with the other hand making the dial. The conventional way of dialing a phone is rather dangerous and can cause traffic accident easily.

Figure 5:
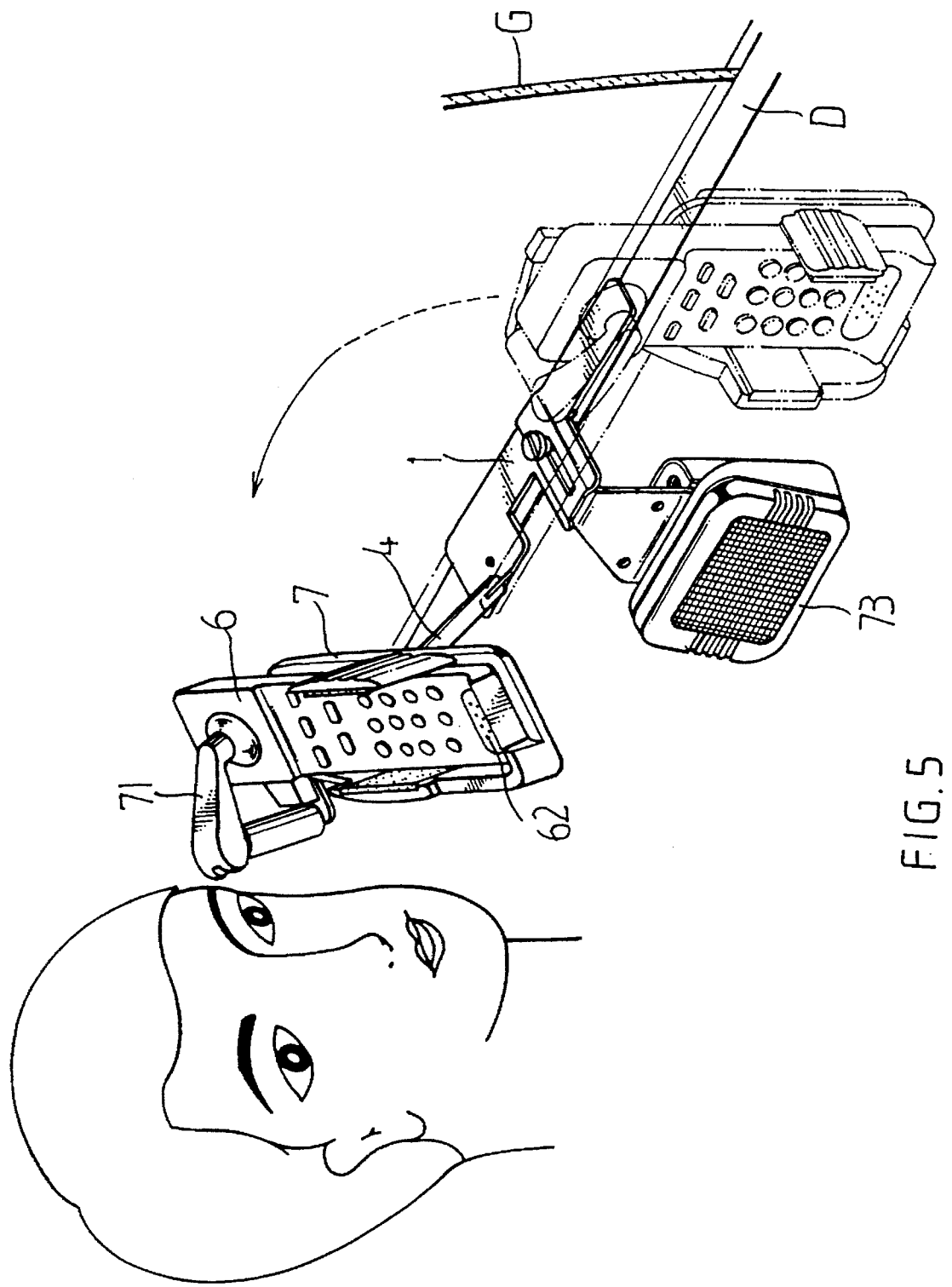
FIG. 5 is a diagram showing the pivotal adjustment of the position of the phone retaining seat to fit to the mouth of a driver.

Referring further to FIG. 3, the slot cut 43 at the other end of the pivot arm 4 is engaged with the obliquely extended lug 122 of the mounting base 1 by a screw 31 led through the through hole 123 and the through hole 41 of the slot cut 43 so that the mounting base 1 is pivotally engaged with the pivot arm 4. The detent member 46 biased the spring 45 can be in locking engagement with the retaining recess 124 so as to lock the pivot arm 4 in place when the pivot arm is pivoted orthogonally to the mounting base 1. When a driver intends to make a phone call, the pivot arm 4 is first pivoted clockwisely and locked in place, as mentioned above, then the phone retaining seat 7 is pivotally adjusted, making the transmitter 62 of the cellular phone 6 come near to the mouth of the driver, as shown in FIG. 5. In reverse, the pivot arm 4 and the phone retaining seat 7 can resume to its original position.

Figure 6:
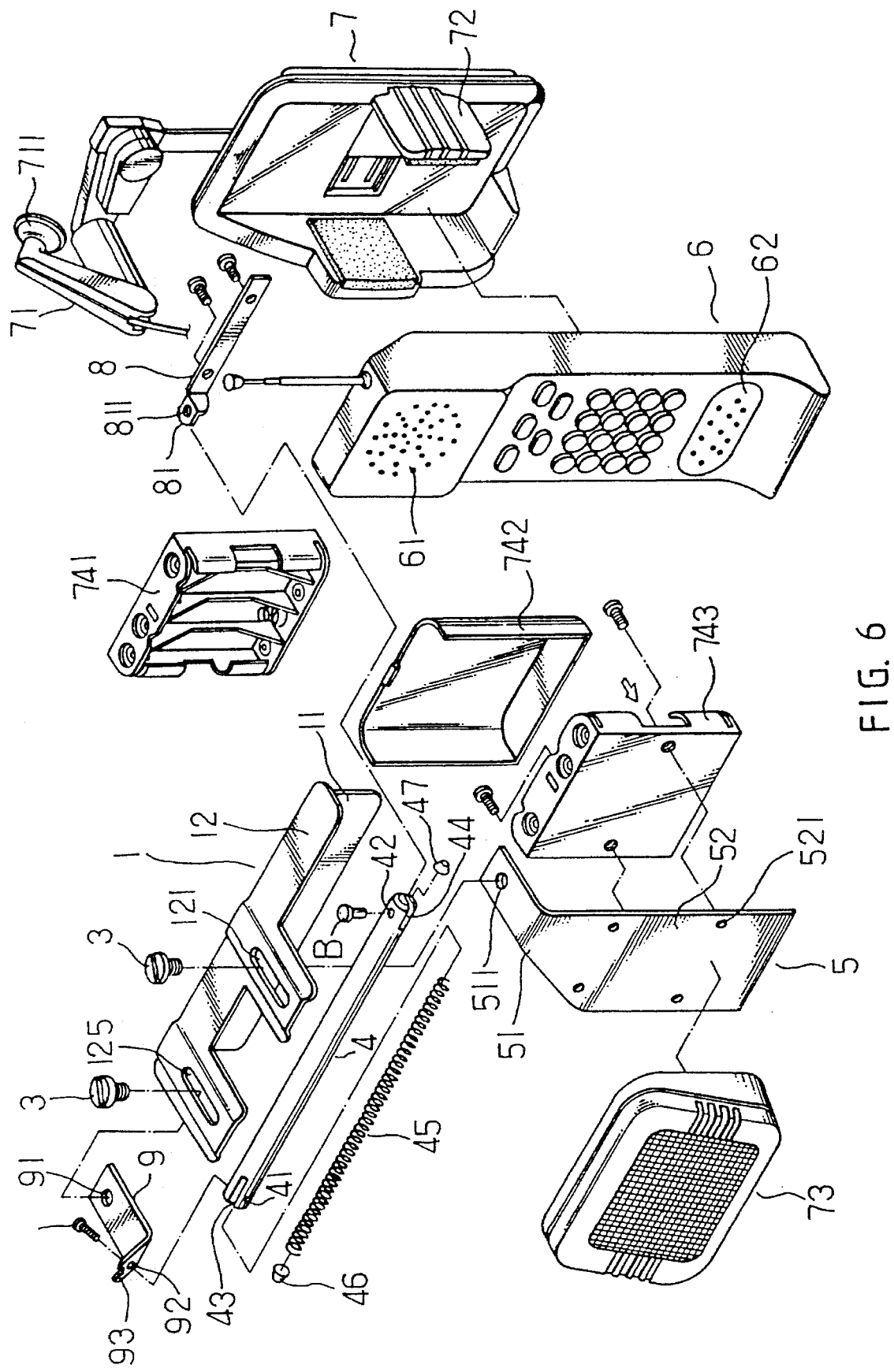
FIG. 6 is a diagram showing the exploded components of another embodiment of the present invention.

Referring to FIG. 6, another embodiment of the present invention is illustrated wherein another horizontal extension having an elongated slot 125 disposed thereon and a slide plate 9 are used to replace the oblique extended lug 122. The slide plate 9 having a through hole 91 at one end thereof and an open-ended retaining recess 93 at the other obliquely extended end is engaged with one end of the pivot arm 4. The slot cut 43 is engaged with the obliquely extended end of the slide plate 9 and the retaining recess 93 can become engaged with the detent member 46 of the pivot arm. Whereby the relative positions of the pivot arm 4, phone retaining seat 7 and the cellular phone 6 can be adjusted in a better manner to cope with different requirments of a driver and spacial variation of a vehicle.

The details of the structure of the phone retaining seat 7 is well known to those skilled in this field, so they are not described in the specification. No matter what type of a retaining seat 7 the present invention is applied to, it is very easy to fix the securing piece 8 to one side or the bottom of the retaining seat 7. As to the battery box 74 and the speaker 73, they can be associated with the retaining seat in various manner in practice. No matter how the battery and the speaker are arranged, the present invention can be readily adapted to different structures of phone retaining means.

I claim:

1. A retaining rack for securing of a cellular phone permitting handfree use of the phone in driving a vehicle, comprising:

a mounting base having a vertical portion and a horizontal portion;

said horizontal portion of said mounting base having an upwardly oblique extension;

said vertical portion of said mounting base being inserted into a fissure between a door and a glass thereof of a vehicle;

a clamping board adjustably engaged with said horizontal portion of said mounting base;

a battery box fixed to one side of said clamping board;

a speaker fixed to the opposite side of said clamping board;

an elongated pivot arm having one end pivotally fixed to said upwardly oblique extension;

a retaining seat for holding a cellular phone in place being engaged with a securing piece;

a voice pick-up means electrically connected to said speaker and adjustably engaged with said retaining seat being movable to abut against a receiver of said cellular phone;

said securing piece being pivotally engaged with the other end of said elongated pivot arm;

whereby said cellular phone held by said retaining seat is movable by pivotal adjustment of said pivot arm and said retaining seat close to the mouth of a driver.

2. A retaining rack as claimed in claim 1 wherein said elongated pivot arm is hollow in structure with a spring housed therein, said pivot arm having a detent means fixed to each end thereof; at one end of said securing piece is disposed a ratchet gear means which is in locking engaged with said detent means so as to retain said retaining seat in place in operation; at the end of said upwardly oblique extension is disposed a retaining means which is engaged with said detent means of said pivot arm so as to lock said pivot arm in place after each pivotal adjustment thereof.

3. A retaining rack as claimed in claim 1 wherein said clamping board has a plurality of fixing means for securing said speaker thereto.

4. A retaining rack as claimed in claim 1 wherein said horizontal portion of said mounting base has a pair of laterally parallel slots, one of the slots is engaged said clamping board by a fixing means so as to permit said clamping board to be outwardly adjusted; and the other slot is engaged by a fixing means with a slide board having an upwardly oblique extension having a recess at the tip thereof so as to permit said pivot arm to be pivotally adjusted and locked in place by said detent means in one aspect and to be outwardly adjusted by actuation of said slide board in another aspect.

5. A retaining rack as claimed in claim 1 wherein one end of said securing piece is fixable to either side of said retaining seat.

* * * * *